(12) United States Patent
Mukundala et al.

(10) Patent No.: US 10,490,008 B2
(45) Date of Patent: Nov. 26, 2019

(54) METHOD FOR SELECTIVELY OPENING A SECOND LOCK FROM A FIRST LOCK USING SHORT-RANGE COMMUNICATIONS (SRC)

(71) Applicant: Carrier Corporation, Palm Beach Gardens, FL (US)

(72) Inventors: Sumanth Kumar Mukundala, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/141,510

(22) Filed: Sep. 25, 2018

(65) Prior Publication Data
US 2019/0259231 A1  Aug. 22, 2019

(30) Foreign Application Priority Data
Feb. 16, 2018  (IN) .............................. 201811005930

(51) Int. Cl.
G07C 9/00 (2006.01)
H04W 4/80 (2018.01)
H04L 29/06 (2006.01)

(52) U.S. Cl.
CPC ..... *G07C 9/00309* (2013.01); *G07C 9/00817* (2013.01); *G07C 9/00857* (2013.01); *H04L 63/083* (2013.01); *H04W 4/80* (2018.02); G07C 2009/00523 (2013.01); G07C 2009/00825 (2013.01); G07C 2009/00865 (2013.01)

(58) Field of Classification Search
CPC .. G07C 9/00309; G07C 9/00857; H04W 4/80
USPC ....................................................... 340/5.61
See application file for complete search history.

(56) References Cited

U.S. PATENT DOCUMENTS

| | | | |
|---|---|---|---|
| 9,685,015 B2 | 6/2017 | Johnson | |
| 2006/0006773 A1 | 1/2006 | Guebre-Tsadik et al. | |
| 2007/0200666 A1 | 8/2007 | Howard | |

(Continued)

FOREIGN PATENT DOCUMENTS

| | | |
|---|---|---|
| CN | 102747932 A | 10/2012 |
| CN | 103174337 A | 6/2013 |

(Continued)

OTHER PUBLICATIONS

Kas; "Bluetooth Lock—A New Frontier of Smart Locks"; retrieved on Feb. 9, 2018; retrieved from the internet; URL:https://kas.com.au/bluetooth-lock-a-new-frontier-of-smart-locks/; 7 pages.

(Continued)

*Primary Examiner* — Vernal U Brown
(74) *Attorney, Agent, or Firm* — Cantor Colburn LLP (57) ABSTRACT

A method is disclosed for selectively opening a second lock of a plurality of locks from a first lock of the plurality of locks using short-range communications (SRC), the method including the first lock performing steps of: receiving a first credential from a portable smart device, determining if a plurality of locks is implicated in the first credential, and when the plurality of locks is implicated by the first credential, the first lock performs steps of: unlocking, and forwarding the first credential to the second lock for determining whether to unlock.

20 Claims, 4 Drawing Sheets

(56) References Cited

U.S. PATENT DOCUMENTS

| | | |
|---|---|---|
| 2009/0006846 A1 | 1/2009 | Rosenblatt |
| 2012/0249290 A1* | 10/2012 | Marsh .................. H04M 11/025 340/5.7 |
| 2014/0260448 A1 | 9/2014 | Beck et al. |
| 2015/0339869 A1 | 11/2015 | Szymke et al. |
| 2016/0035160 A1 | 2/2016 | Friedli |
| 2016/0035161 A1* | 2/2016 | Friedli .................. B66B 1/468 340/5.28 |

FOREIGN PATENT DOCUMENTS

| | | |
|---|---|---|
| CN | 103383199 B | 6/2014 |
| CN | 104631958 A | 5/2015 |
| CN | 106934903 A | 7/2017 |
| CN | 106948674 A | 7/2017 |
| WO | 2015191190 A1 | 12/2015 |

OTHER PUBLICATIONS

Sousa, et al.; "Wirelss Control and Network Management of Dooe Locks";2015; IEEE; 2 pages.
Extended European Search Report for European Application No. 19157564.6; Date of Completion Jun. 21, 2019; dated Jun. 28, 2019; 10 pages.

* cited by examiner

METHOD FOR SELECTIVELY OPENING A SECOND LOCK FROM A FIRST LOCK USING SHORT-RANGE COMMUNICATIONS (SRC)

CROSS REFERENCE TO RELATED APPLICATIONS

This application claims the benefit of an earlier filing date from Indian Provisional Application Serial No. 201811005930 filed Feb. 16, 2018, the entire disclosure of which is incorporated herein by reference.

BACKGROUND

The disclosed embodiments related to controlling of a plurality of locks on a plurality of doors and more specifically selectively opening a second lock from a first lock using short-range communications (SRC).

In areas secured by an access control system, users are often required to present some form of credentials before being allowed to pass through a door or other barrier. For example, a user may need to use one or more of a key (mechanical or electronic), a code, a biometric feature or other device to obtain access.

In hotels with master suites having sub suites, each sub suite may have a lockable door. For adequate security each sub suite should have its own security lock since sub suites can be sold separately or together. However, requiring hotel guests to use credentials multiple times when arriving to the master suite could be tedious. Unlocking all doors together upon entry to the master suite may create security issues. A solution to this issue is needed.

BRIEF DESCRIPTION

Disclosed is a system for selectively opening a second lock from a first lock using short-range communications (SRC), the system being disposed in a building that includes at least a partition divided into a plurality of rooms, including a first room and a second room, the plurality of rooms including a respective plurality of egress doors, wherein the first room includes a first door and the second room includes a second door, the system comprising: a plurality of locks including the first lock for locking the first door and the second lock for locking the second door, the plurality of locks communicating with short range communication (SRC) protocols, wherein the first lock: receives a first credential from a portable smart device, determines if the plurality of locks is implicated in the first credential, and when the plurality of locks is implicated by the first credential, the first lock: unlocks, and forwards the first credential to the second lock.

In addition to one or more of the above features, or as an alternate, when the plurality of locks is implicated by the first credential: after the first lock unlocks and before the first lock forwards the first credential to the second lock, the first lock determines if the first door is opened, wherein the first lock forwards the first credential to the next lock only after the first door is opened.

In addition to one or more of the above features, or as an alternate before the first lock determines whether the plurality of locks is implicated by the first credential, the first lock determines a class of access associated with the first credential, wherein when the class of access provides general access, the first lock opens and does not forward the first credential to the second lock.

In addition to one or more of the above features, or as an alternate, before the first lock determines the class of access associated with the first credential, the first lock determines whether the first credential is valid.

In addition to one or more of the above features, or as an alternate, the plurality of rooms includes a third room, the plurality of egress doors includes a third door for the third room, and the plurality of locks includes a third lock for locking the third door, and the second lock: receives the first credential from the first lock, determines if the plurality of locks is implicated by the first credential, wherein when the plurality of locks are implicated by the first credential, the second lock: forwards the first credential to the third lock.

In addition to one or more of the above features, or as an alternate, the second lock determines if the second lock is implicated by the first credential, wherein when the second lock is implicated by the first credential, the second lock unlocks.

In addition to one or more of the above features, or as an alternate, when the second lock is implicated by the first credential, before the second lock forwards the first credential to the third lock, the second lock determines whether the second door is opened, wherein the second lock forwards the first credential to the third lock only after the second door is opened.

In addition to one or more of the above features, or as an alternate, the third lock: receives the first credential from the second lock, determines if the third lock is implicated by the first credential, and wherein when the third lock is implicated by the first credential, the third lock opens.

In addition to one or more of the above features, or as an alternate, the plurality of rooms includes a third room, the plurality of egress doors includes a third door for the third room, and the plurality of locks includes a third lock for locking the third door, and the second lock and third lock concurrently: receive the first credential from the first lock, wherein the second lock: determines if the second lock is implicated by the first credential, and when the second lock is implicated by the first credential, the second lock opens; and wherein the third lock: determines if the third lock is implicated by the first credential, and when the third lock is implicated by the first credential, the third lock opens.

In addition to one or more of the above features, or as an alternate, the first lock determines if the first door is opened by detecting motion in a first door handle for the first door lock and/or detecting motion in the first door.

Further disclosed is a method for controlling a system for selectively opening a second lock from a first lock using short-range communications (SRC), the system including one or more of the above disclosed features, and wherein the method includes performing one or more of the above disclosed functions.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
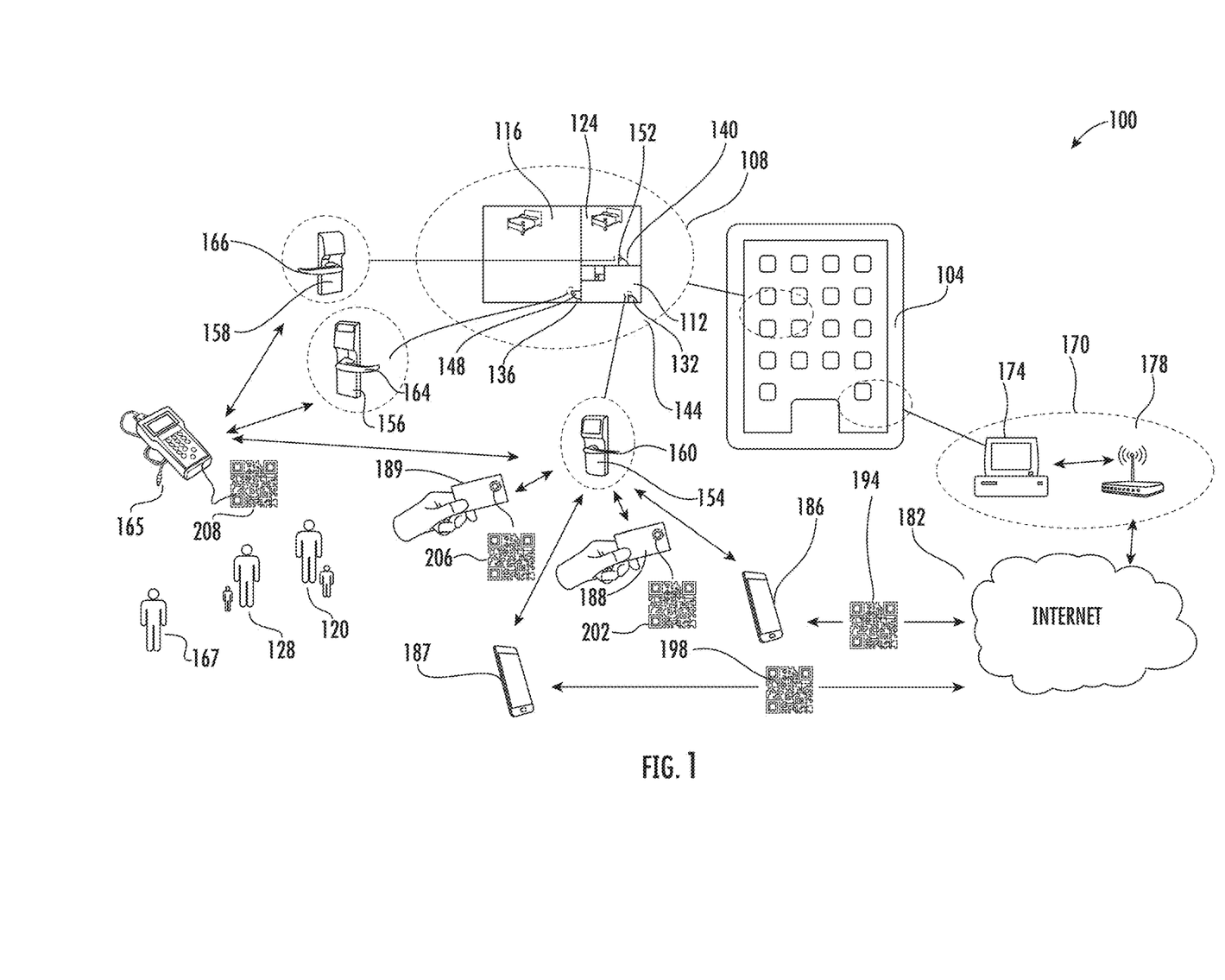
FIG. 1 illustrates a system for selectively controlling a second lock from a first lock using short range communications according to an embodiment.

FIG. 1 illustrates a system 100 for selectively controlling a second lock from a first lock using short range communications (SRC) according to an embodiment. A building 104, such as a hotel, may include a partition which is a master suite 108. The master suite 108 may be divided into a plurality of sub partitions which are accessible rooms. The accessible rooms may include a first room 112 which is a living room. In addition, the rooms may include a second room 116 which is a first sub suite for accommodating a first family 120, and a second room 124 which is a second sub suite for accommodating a second family 128. It is to be appreciated that each room may have one or more rooms therein. For example, each sub suite may have a bathroom.

The master suite 108 may include a plurality of egress openings for the plurality of accessible rooms. The plurality of egress openings may include a first opening 132 for egress into the first room from the outside of the master suite. The plurality of egress openings may include a second opening 136 for egress into the second room, and a third opening 140 for egress into the third room.

The master suite 108 may include a plurality of doors for the plurality of egress openings. The plurality of doors may include a first door 144 for the first opening. The plurality of doors may further include a second door 148 for the second opening and a third door 152 for the third opening.

The master suite 108 may have a plurality of door locks for the plurality of doors. The plurality of door locks may include a first lock 154 for the first door. The plurality of door locks may further include a second lock 156 for the second door and a third lock 158 for the third door. For purposes of this disclosure, the plurality of door locks form a first set of door locks.

The door locks have a plurality of actuators which are manual actuators such as door handles. The plurality of actuators may include a first actuator 160 for the first lock. The plurality of actuators may further include a second actuator 164 for the second lock and a third actuator 166 for the third lock.

The door locks may be smart devices. Smart devices are electronic devices, generally connected to other devices or networks via different wireless telecommunication protocols and some of which can operate to some extent interactively and autonomously. The door locks may be capable of electronic short range communications (SRC). In particular the door locks may be capable of communicating over a private area network (PAN). PAN technologies include, for example, Bluetooth Low Energy (BTLE), which is a wireless technology standard designed and marketed by the Bluetooth Special Interest Group (SIG) for exchanging access codes (credentials) over short distances using short-wavelength radio waves. Of course, these are non-limiting examples of wireless telecommunication protocols. Another form of short range communication within the scope of this disclosure includes multicast wireless sensor networks such as ANT Wireless (a division of Dynastream Innovations) or other wearable type of authentication technology, which is conceptually similar to BTLE.

PAN technologies also include Zigbee, a technology based on Section 802.15.4 from the Institute of Electrical and Electronics Engineers (IEEE). More specifically, Zigbee represents a suite of high-level communication protocols used to create personal area networks with small, low-power digital radios for low-power low-bandwidth needs, and is suited for small scale projects using wireless connections.

The door locks may also equipped with Radio-frequency identification (RFID) technology. RFID technology is another SRC technology used for communicating with an integrated chip (IC) on an RFID smartcard. RFID readers and cards are typically used for guest access in a hotel. A guest is issued an RFID card that has encoded access rights. When the RFID card is presented to a door lock, the door lock reads the access rights from the RFID card and the lock verifies whether the person holding the RFID card has the right to unlock that door. If the RFID card contains the necessary credentials, the door unlocks.

In addition, the door locks may be capable of sensing when the doors are opened. For example, the door locks may electronically sense when the door handles turn. Alternatively, the door locks may electronically sense when the door is in motion and/or moved from the closed position. Such sensing could be obtained using an accelerometer, a rotation sensor, a door position sensor, or other such relevant sensor as would be appreciated by one of ordinary skill in the art.

Thus, upon turning a door handle, and/or upon moving a door from the closed position, the door lock may determine that the door is opened and a person has walked through the door.

The door locks may be capable of being programed to function as described herein using, for example, an Extended Portable Programmer 165 by a hotel employee 167. A commercially available Extended Portable Programmer (XPP) is manufactured by Onity, Inc. (www.Onity.com), which is part of UTC Climate, Controls & Security, a unit of United Technologies Corp.

The hotel may include a control center 170, which is an electronic communications hub. The control center may include a reservation system 174 and an access point 178 to communicate over the Internet 182. For example the control center may communicate over the Internet using local area network (LAN) protocols such as Wi-Fi, which is a technology based on the Section 802.11 from the IEEE.

The families may have a first plurality of portable smart devices which may be a plurality of mobile phones or wearable having similar capabilities, though mobile phones shall be referenced herein for this category of technology. The plurality of mobile phones may include first mobile phone 186 for the first family and a second mobile phone 187 for the second family. The plurality of mobile phones may be equipped with PAN technology to communicate with the plurality of door locks, as disclosed below, to open locks in the master suite.

The families may also have a second plurality of portable smart devices, which may be a plurality of smartcards. The plurality of smartcards may include a first smartcard 188 for the first family and a second smartcard 189 for the second family. The plurality of smartcards may be equipped with RFID technology to communicate with the plurality of door locks as disclosed below to unlock the door locks.

The mobile phones may be capable of communicating over the Internet with the hotel control center 170 using an App available from an App Store. An App store is a digital distribution platform for distributing computer software applications over the Internet. The hotel control center may transfer to the portable smart devices a plurality of credentials, including a first credentials 194 to the first mobile phone and a second credential 198 to the second mobile phone.

On the other hand, the smartcards may be stored and programmed at the hotel control center and provided to the plurality of families at check-in. That is, the control center may provide a third credential 202 to the first smartcard and a fourth credential 206 to the second smartcard. It is to be appreciated that the first credential and third credential may open the same locks. Similarly, the second credential and fourth credential may open the same locks. In addition, a fifth credential 208 may be stored on the XPP or on another RFID card for use by a Hotel employee. In some embodiments, the first and third credential may be the same and the second and fourth credential may be the same.

The credentials may identify the type of the access associated with the credential. A type of access may be guest user access, which is limited access. For example, if the user is a guest who is a member of the first family, the user may have authorization to open the first lock and the second lock. On the other hand, if the user is a guest who is a member of the second family, the user may have authorization to open the first lock and the third lock. Another type of access may be hotel employee access, which may include general access rights to all locks in a hotel.

According to an embodiment, and as further illustrated below, presentation of the first credential or third credential to the first lock results in opening the first lock and automatic opening of the second lock. Presentation of the second credential or fourth credential to the first lock results in opening the first lock and automatic opening of the third lock. Though a hotel employee may have general access, according to an embodiment the employee may be required to open each door individually.

The credentials may further include a time period in which the credentials are valid. For example the time period may have a start date and an end date.

Figure 2:
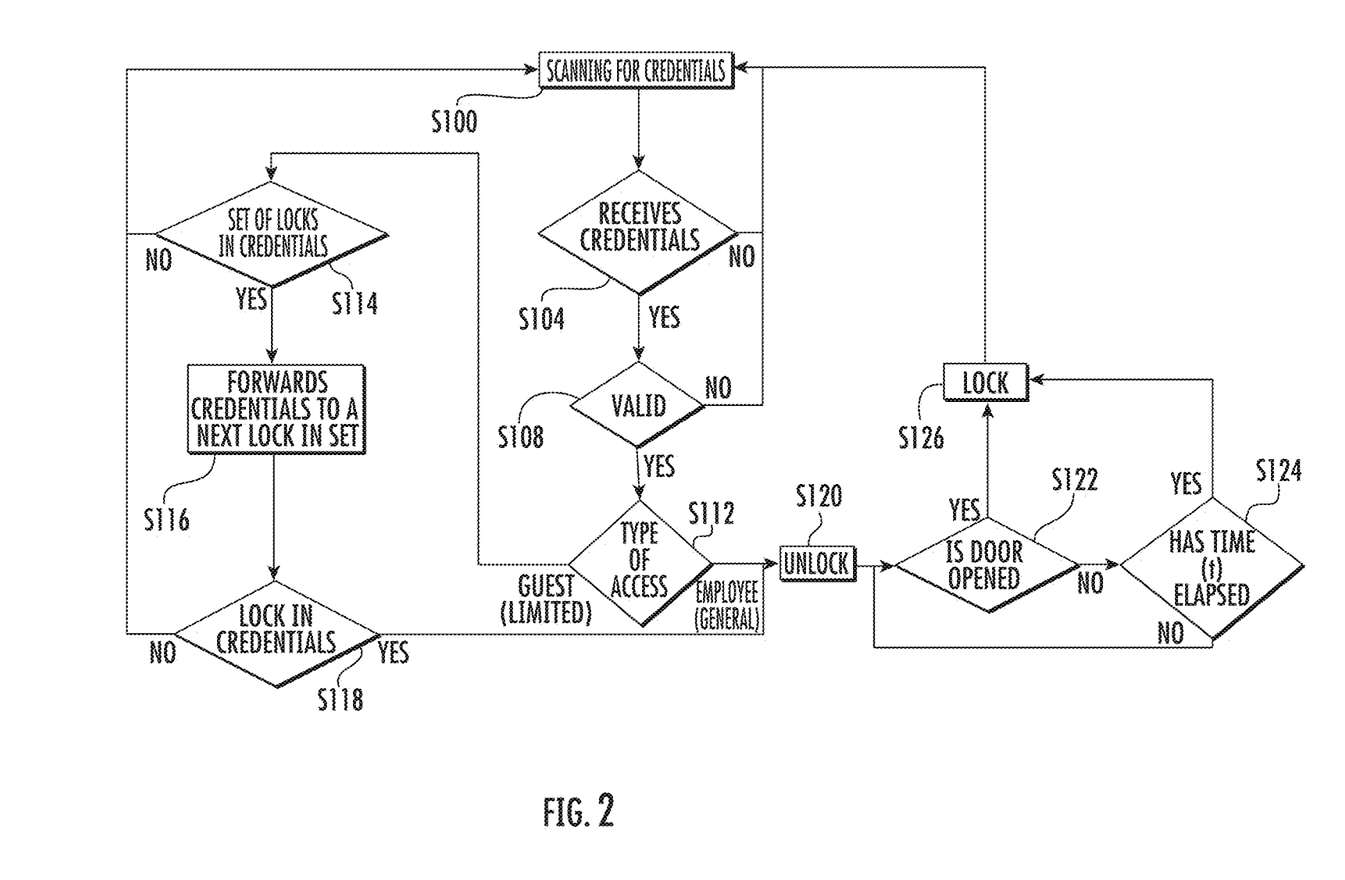
FIG. 2 illustrates a process for selectively controlling a second lock from a first lock using short range communications according to an embodiment.

FIG. 2 illustrates a process for operating a second lock from a first lock using short range communications (SRC) according to an embodiment. In general, the first lock receives a credential and selectively forwards the credential to a second lock to open the second lock. It is to be appreciated that this disclosure is not intended to be limiting. According to the disclosure, any lock could be configured to forward credentials to another lock or set of locks. In addition, a first lock may be configured to immediately pass credentials to other locks. Alternatively, a first lock may pass credentials to another lock or locks after the first lock senses the handle in the first lock has been rotated, or after the door secured by the first lock has been moved, confirming that the guest has walked into the suite.

At step S100 the first lock may scan for credentials using short range communication (SRC) protocols. That is, if the lock is attempting to read an RFID card, it does so upon detecting the presence of the card, after which the lock would read the card. If the lock is attempting to communicate with a mobile device, the lock would advertise a Bluetooth signal to indicate its availability. A nearby mobile phone under control of a person authorized to enter a suite would connect with the lock and send a credential to the lock. These are non-limiting examples of a first lock scanning for credentials.

At step S104 the first lock may make a determination of whether the lock has received credentials. So long as the determination in step S104 is "no" scanning may continue. When the determination in step S104 is "yes", the first lock may perform step S108 of determining whether the credentials are valid. A determination of valid credentials may include checking a starting date and ending date to ensure the credentials may be used at the current time. In an embodiment the lock keeps the current time. Other non-limiting examples for determining a valid credential are well understood in the art. If the determination in step S108 is "no", then the first lock may loop back to step S100 along with providing the user feedback to indicate the invalid credential. If the determination by the first lock at step S108 is "yes", then the first lock may perform step S112 of examining the credentials to determine the type of access associated with the credential.

If the determination of step S112 is guest access, that is, limited access, then the first lock may optionally perform step S114 of determining whether the first set of locks is identified for access in the credentials. If the determination by the first lock is "no" in step S114, the first lock may return to step S100 again with appropriate feedback. For example, an LED or buzzer on the lock or a software enabled indicator on the phone may indicate that the door did not unlock, and perhaps indicate why the door did not unlock.

If the first lock renders a "yes" determination at step S114, the first lock may perform step S116 of forwarding the credentials to a next lock in the set. In this instance the next lock in the first set of locks is the second lock. Then the first lock may perform step S118 of determining whether the lock itself is identified for access in the credentials.

In one embodiment, step S118 includes checking an identifier in the credentials against an identifier in the first lock. If the identifiers match then the credentials are authorized for opening the first lock. An example matching criteria is where the identifier in the credentials is equal to or greater than an identifier in the first lock. In one embodiment the credentials checked in step S118 are checked in step S108 and the result of checking the credentials is used at step S118. Other non-limiting examples for step S118 are well understood in the art. If the determination at step S118 is "no" the first lock may return to step S100 again with appropriate feedback.

If the determination by the first lock is "yes" at step S118, the first lock may perform step S120 of unlocking the first lock. The first lock may then perform step S122 of determining whether the first door is opened. During step S122, the first lock may check for whether the first handle is turned and/or whether the door had moved from the closed position.

While the determination at step S122 is "no" the lock may perform step S124 of determining whether a predetermined time window (t) for inactivity has lapsed. As can be appreciated, this is a safety precaution. While the determination at step S124 is "no" the first lock may return to step S122. If either of step S122 or step S124 is "yes" as determined by the first lock, then the first lock may perform step S126 and lock. Thereafter, the first lock may return to step S100 to scan for credentials.

Returning to step S112, the first lock may determine that the credentials are associated with hotel employee access, or general access. The first lock may perform step S120 of unlocking and then continue to perform the steps identified above. This way, the hotel employee must open each lock individually. It should be appreciated that while the above description describes the behavior of the first lock, the second lock may also follow the process starting with S100 where scanning for credentials may include receiving credentials from the first lock.

It is to be appreciated that the first lock will always be identified in the credentials in which the first set of locks is identified. However, where, for example, the second lock receives the second or third credentials identified above, the second lock would not be identified for access in the credentials. An example of this executing the above process under such conditions is discussed below.

Figure 3:
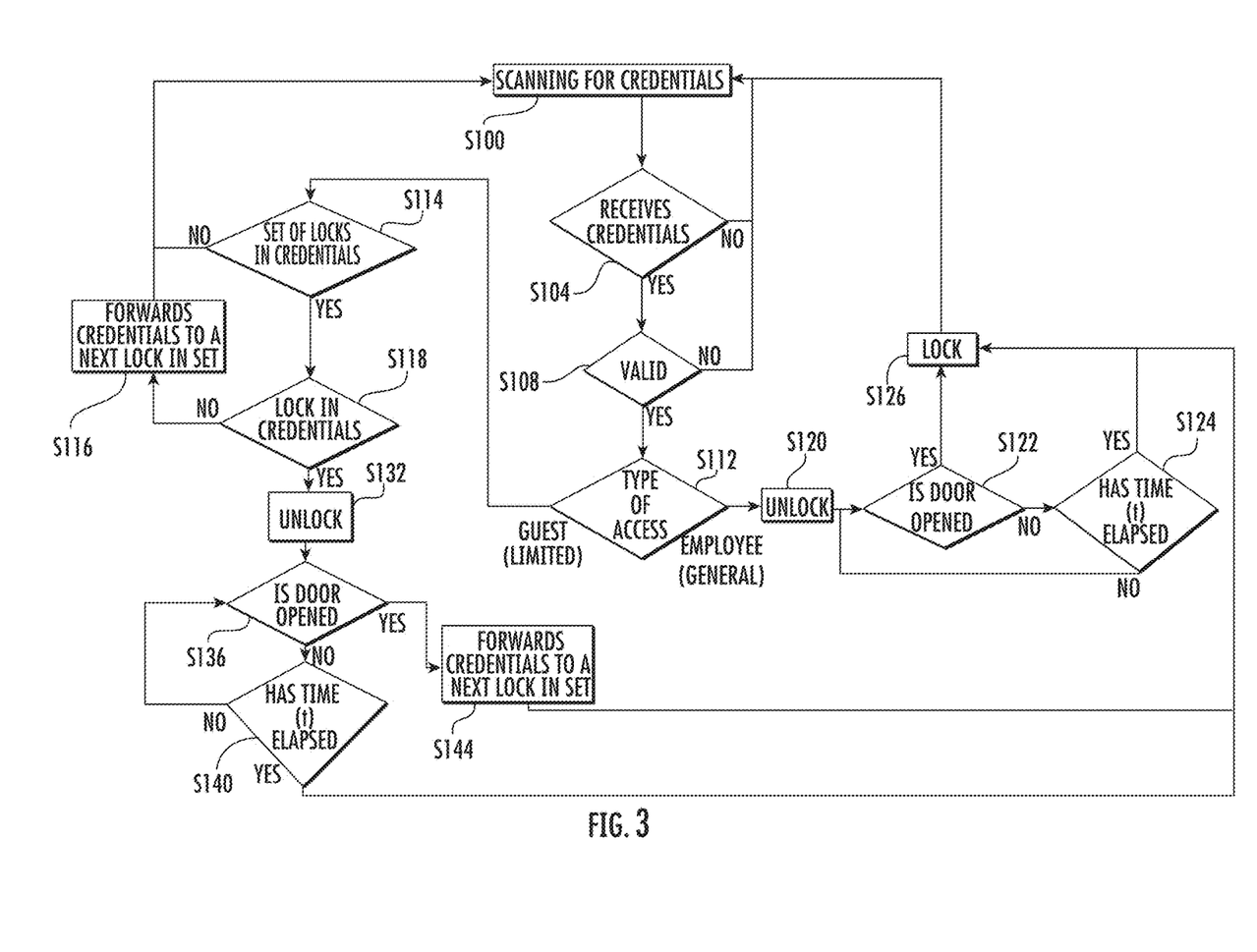
FIG. 3 illustrates a process for selectively controlling a second lock from a first lock using short range communications according to an embodiment.

An alternative process to that illustrated in FIG. 2 is illustrated in FIG. 3, wherein like numbers to FIG. 2 represent a like processes. In this embodiment if the first lock is identified for access in the credentials, the first lock forwards the credentials to the next lock only after detecting that the first door is opened. Thus, in this embodiment the next lock need not open if a user decides, for example, to not enter the master suite. As can be appreciated, this is a safety feature.

In this embodiment, after a "yes" determination at step S118, the first lock, for example, may perform step S132 of unlocking. At step S136 the first lock may determine whether the first door is opened. Similar to step S122, while the determination of step S136 is "no," the first lock may perform step S140 of determining if the predetermined time (t) has elapsed.

The predetermined time (t) may be, for example, 30 seconds. This would allow someone to walk up to the lock and open it. If the lock is not opened in that time, the lock would resume back to the quiescent state. In addition, being that the person needs to walk to the locks within the suite, the predetermined time (t) may be a plurality of predetermined times (t)n, n being the number of locks. Each individual time period (t)i allowing for approach to that lock. Thus the first lock may have a first predetermined time (t)1 for unlocking the first lock that may be different than the second predetermined time t(2) for approaching and unlocking the second lock and the third predetermined time (t)3 for approaching and unlocking the third lock. The second and third locks may only need to include approach times when the locks are not accessed directly from the person but instead receive credentials from the first lock over the PAN.

If the determination of step S140 is "yes", the first lock may perform step S126 of locking and continue through the process as indicated above. If, however, the determination of step S136 is "yes", the first lock may perform step S144 of forwarding the credentials to the next lock in the set of locks. Then the first lock may perform step S126 of locking and then continues to perform the process steps illustrated in the figure and detailed above.

In this embodiment, credentials are also forwarded to the next lock upon a "no" determination at step S118. This means that the credential identifies the set of lock but not the lock itself. This would apply where, for example, the second lock receives the second or fourth credentials, in which the third lock but not the second lock are authorized to open. Thereafter the second lock may perform step S116 of forwarding the credentials to the next lock in the set (which may be the third lock in this example) and then return to step S100. In this manner the credentials may be shared by all the locks in the set even though not all locks will have a "yes" determination at step S118.

A determination of "yes" at step S118 may occur for the first lock receiving any of the four credentials defined above and for the second lock receiving the first and third credentials defined above.

In one embodiment, each lock in the set of locks sequentially receives the credentials and determines whether to unlock, as indicated above. That is the first lock processes the credentials and transmits the credentials to the second lock. The second lock processes the credentials and transmits the credentials to the third lock. The third lock then processes the credentials. When the third lock is the last lock in the set, the third lock performs the process illustrated in FIG. 4 wherein like numbers to FIG. 2 represent a like processes.

In an embodiment where the short range communication (SRC) is Bluetooth transmitting the credentials may include a sending lock, for example the first lock, momentarily operating as a Bluetooth central device. In such embodiment the sending lock scans for nearby Bluetooth peripheral devices. The sending lock may usually operate as a Bluetooth peripheral device and may advertise its presence or availability periodically with a Bluetooth advertisement. For example the advertisement may be sent once per second. When the sending lock scans and discovers receiving locks that are in the set of locks, the sending lock may connect to the receiving lock and transmit the credentials. Once the credentials are transmitted the sending lock may disconnect. If multiple receiving locks in the set of locks are discovered in the scan, the sending lock may connect to multiple receiving locks simultaneously or in rapid sequence to transmit the credentials to all of the receiving locks in the set of locks that are reachable by SRC from the sending lock.

In the disclosed illustration, the sending lock is the first lock and the receiving locks are the second lock and the third lock. It is to be appreciated that other methods of transmitting may be used over SRC including messaging over mesh networks, PAN connections directly to other locks or to access points or over disparate network types to eventually reach the receiving locks. Thus, locks in a spatially large environment that are in the same set of locks and are unreachable by one telecommunications hop using SRC protocols may still be controlled as indicated hereinabove.

Figure 4:
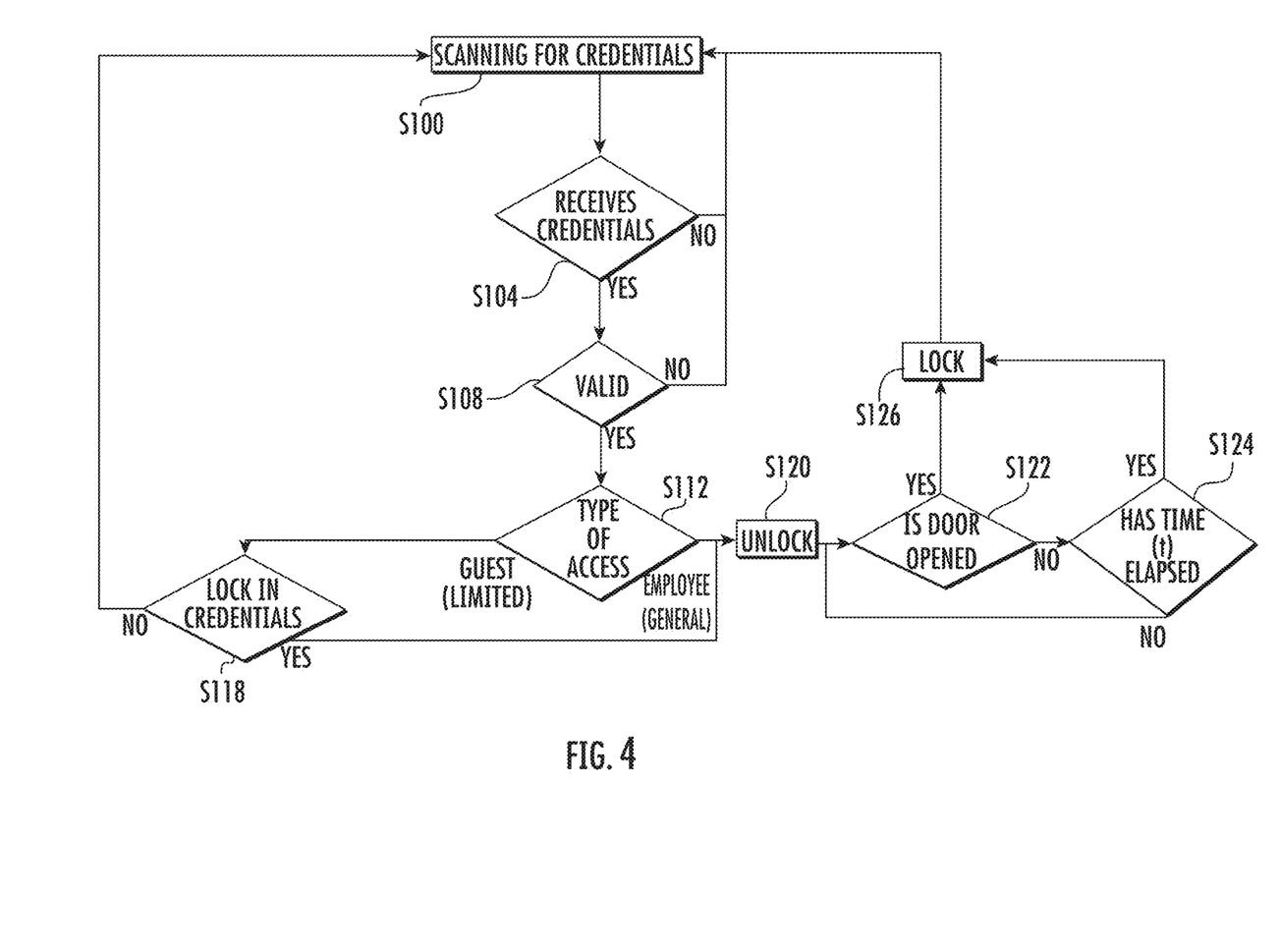
FIG. 4 illustrates a process for selectively controlling a second lock from a first lock using short range communications according to an embodiment.

Turning to FIG. 4, at step S118 the third lock determines that it is identified in the set of credentials. Then the third lock unlocks at step S120 and the third lock continues to perform the process steps illustrated in the figure and detailed above. If the determination by the third lock is "no" at step S118, the third lock returns to step S100.

In one embodiment, the second lock and third lock, that is, each downfield lock in the set of locks concurrently determines whether to unlock. In such embodiment, both the second and third locks may receive the credentials from the first lock and perform the process illustrated in FIG. 3. In other words, the first lock may transmit the credentials to all locks in the set, which include the second lock and third lock, if they are within short range communication (SRC) distance to the first lock.

It should be appreciated that when performing the process in FIG. 3. the credentials may not be forwarded further by door (n) if credentials are sent to both door (n) and door (n+1), where each door (n) and door (n+1) have their own set of downfield doors, and the person enters door (n+1). Here n can be 2 and n+1 can be three. Thus, in this example, if the person proceeds through the third door, the third lock may transmit the credentials to yet other unmentioned locks in the set. In comparison the second lock would timeout and not transmit the credentials further. It should be appreciated that there may be more than a first lock, a second lock and a third lock. That is, an arbitrarily large set of locks may share credentials from lock to lock either sequentially or in a multi-cast mode where credentials are shared with as many locks in the set as are within range.

The following is an example of the disclosed process applied to the embodiment illustrated in FIG. 1. If a guest provides any of the four credentials disclosed above to the first lock, according to FIG. 2, the first lock would determine "yes" at steps S104 and S108, followed by "guest" at step S112 and "yes" at step S114. The first lock would forward the credentials to the second lock at step S116 and then the first lock would determine "yes" at step S118. The first lock would then unlock at step S120. The first lock will then lock, pursuant to steps S124 through S126. If the process of FIG. 3 were followed, then after "yes" in step S114, the first lock would determine "yes" in step S118 and unlock per step S132. Thereafter, if the first door opens, then the first lock forwards the credentials per step S144. Otherwise, the first lock does not forward the credentials.

In the configuration where the locks sequentially determine whether to unlock, the second lock will process the first or third credentials according to FIG. 2 or 3, and the outcome would be the same as for the first lock described above. In such configuration, if the second lock processes the second or fourth credentials according to FIG. 2 or 3, however, the outcome would differ from that of the first lock. In FIGS. 2 and 3, at step S118, the determination by the second lock would be "no". At this point in FIG. 2 the second lock would return to step S100. At this point in FIG. 3 the second lock would forward credentials to the next lock at step S116, and then return to step S100. As illustrated in FIG. 2, the credentials would have been forwarded at step S116.

Moreover, if the fifth credentials defined above are received by any lock in the set of locks, as illustrated in FIGS. 2 through 4, the lock may determine "employee" at step S112. Thereafter the lock may unlock at step S120 and continue with the process illustrated in the respective figure and identified above. Thus, regardless of which lock in the set receives an employee's credentials, these credentials may not be forwarded to next lock in the set. It should be appreciated that this example of the fifth credentials is not limited to "employee" use and is used here as an example of credentials that are not shared versus credentials that are shared between a set of locks.

In sum, the disclosed embodiments provide a lock that can be configured so that when it is actuated it will send the credential it received to a next lock in a set. The next lock will validate the received credential based on the programming that is in the next lock in a set of locks. The format of the credential would include information such as expiration time of the credential and also access rights indicating which locks could be opened. For example, the access rights could indicate that the first lock and second lock could be opened. Or the credentials could indicate that the first lock and third lock could be opened. Or the credentials could indicate all locks depending on a guest's access rights. Any other set of locks could be arranged with such access rights.

In addition, any lock could be configured to transfer credentials to another lock. There may be a large chain of locks that pass credentials. The configuration could be to immediately pass the credentials. Alternatively, the credentials may be passed after the lock handle has been rotated and a door is opened.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for selectively opening a second lock from a first lock using short-range communications (SRC),
    the system being disposed in a building that includes at least a partition divided into a plurality of rooms, including a first room and a second room, the plurality of rooms including a respective plurality of egress doors, wherein the first room includes a first door and the second room includes a second door,
    the system comprising:
    a plurality of locks including the first lock for locking the first door and the second lock for locking the second door, the plurality of locks communicating with short range communication (SRC) protocols,
    wherein the first lock:
    receives a first credential from a portable smart device,
    determines if the plurality of locks is implicated in the first credential, and
    when the plurality of locks is implicated by the first credential, the first lock:
    unlocks, and
    forwards the first credential to the second lock.

2. The system of claim 1, wherein when the plurality of locks is implicated by the first credential:
    after the first lock unlocks and before the first lock forwards the first credential to the next lock, the first lock determines if the first door is opened, wherein the first lock forwards the first credential to the second lock only after the first door is opened.

3. The system of claim 2, wherein:
    before the first lock determines whether the plurality of locks is implicated by the first credential, the first lock determines a class of access associated with the first credential, wherein when the class of access provides general access, the first lock opens and does not forward the first credential to the second lock.

4. The system of claim 3, wherein before the first lock determines the class of access associated with the first credential, the first lock determines whether the first credential is valid.

5. The system of claim 4, wherein the plurality of rooms includes a third room, the plurality of egress doors includes a third door for the third room, and the plurality of locks includes a third lock for locking the third door, and
    wherein the second lock:
    receives the first credential from the first lock,
    determines if the plurality of locks is implicated by the first credential, wherein when the plurality of locks are implicated by the first credential, the second lock:
forwards the first credential to the third lock.

6. The system of claim 5, wherein the second lock determines if the second lock is implicated by the first credential, wherein when the second lock is implicated by the first credential, the second lock unlocks.

7. The system of claim 6, wherein when the second lock is implicated by the first credential, before the second lock forwards the first credential to the third lock, the second lock determines whether the second door is opened, wherein the second lock forwards the first credential to the third lock only after the second door is opened.

8. The system of claim 7, wherein the third lock:
receives the first credential from the second lock,
determines if the third lock is implicated by the first credential, and
wherein when the third lock is implicated by the first credential, the third lock opens.

9. The system of claim 1, wherein the plurality of rooms includes a third room, the plurality of egress doors includes a third door for the third room, and the plurality of locks includes a third lock for locking the third door, and
wherein the second lock and third lock concurrently:
receive the first credential from the first lock,
wherein the second lock:
determines if the second lock is implicated by the first credential, and
when the second lock is implicated by the first credential, the second lock opens; and
wherein the third lock:
determines if the third lock is implicated by the first credential, and
when the third lock is implicated by the first credential, the third lock opens.

10. The system of claim 2, wherein the first lock determines if the first door is opened by detecting motion in a first door handle for the first door lock and/or detecting motion in the first door.

11. A method for operating a system for selectively opening a second lock from a first lock using short-range communications (SRC),
the system being disposed in a building that includes at least a partition divided into a plurality of rooms, including a first room and a second room, the plurality of rooms including a respective plurality of egress doors, wherein the first room includes a first door and the second room includes a second door,
the system including:
a plurality of locks including the first lock for locking the first door and the second lock for locking the second door, the plurality of locks communicating with short range communication (SRC) protocols,
wherein the method comprises first lock performing steps of:
receiving a first credential from a portable smart device,
determining if the plurality of locks is implicated in the first credential, and
when the plurality of locks is implicated by the first credential, the first lock performs steps of:
unlocking, and
forwarding the first credential to the second lock.

12. The method of claim 11, wherein when the plurality of locks is implicated by the first credential:
after unlocking and before forwarding the first credential to the next lock, the first lock determines if the first door is opened, wherein the first lock forwards the first credential to the second lock only after the first door is opened.

13. The method of claim 12, wherein:
before determining whether the plurality of locks is implicated by the first credential, the first lock determines a class of access associated with the first credential, wherein when the class of access provides general access, the first lock opens and does not forward the first credential to the second lock.

14. The method of claim 13, wherein before the first lock determines the class of access associated with the first credential, the first lock determines whether the first credential is valid.

15. The method of claim 14, wherein the plurality of rooms includes a third room, the plurality of egress doors includes a third door for the third room, and the plurality of locks includes a third lock for locking the third door, and
wherein the second lock:
receives the first credential from the first lock,
determines if the plurality of locks is implicated by the first credential,
wherein when the plurality of locks are implicated by the first credential, the second lock:
forwards the first credential to the third lock.

16. The method of claim 15, wherein the second lock determines if the second lock is implicated by the first credential, wherein when the second lock is implicated by the first credential, the second lock unlocks.

17. The method of claim 16, wherein when the second lock is implicated by the first credential, before the second lock forwards the first credential to the next lock, the second lock determines whether the second door is opened, wherein the second lock forwards the first credential to the third lock only after the second door is opened.

18. The method of claim 17, wherein the third lock:
receives the first credential from the second lock,
determines if the third lock is implicated by the first credential, and
wherein when the third lock is implicated by the first credential, the third lock opens.

19. The method of claim 11, wherein the plurality of rooms includes a third room, the plurality of egress doors includes a third door for the third room, and the plurality of locks includes a third lock for locking the third door, and
wherein the second lock and third lock concurrently:
receive the first credential from the first lock,
wherein the second lock:
determines if the second lock is implicated by the first credential, and
when the second lock is implicated by the first credential, the second lock opens; and
wherein the third lock:
determines if the third lock is implicated by the first credential, and
when the third lock is implicated by the first credential, the third lock opens.

20. The method of claim 12, wherein the first lock determines if the first door is opened by detecting motion in a first door handle for the first door lock and/or detecting motion in the first door.

* * * * *